2 Sheets—Sheet 1.

G. W. HART.

ELECTRIC SNAP SWITCH.

No. 11,395. Reissued Dec. 12, 1893.

WITNESSES

Joseph Arthur Cantin.

Arthur B. Jenkins

INVENTOR

Gerald W. Hart.

by Chas. L. Burdett,

Attorney

G. W. HART.

ELECTRIC SNAP SWITCH.

No. 11,395. Reissued Dec. 12, 1893.

WITNESSES

Joseph Arthur Cantin.

Arthur B. Jenkins.

INVENTOR

Gerald W. Hart.

by Chas. L. Burden,

Attorney

UNITED STATES PATENT OFFICE.

GERALD W. HART, OF WINDSOR, ASSIGNOR, BY DIRECT AND MESNE ASSIGNMENTS, TO THE HART & HEGEMAN MANUFACTURING COMPANY, OF HARTFORD, CONNECTICUT.

ELECTRIC SNAP-SWITCH.

SPECIFICATION forming part of Reissued Letters Patent No. 11,395, dated December 12, 1893.

Original No. 459,706, dated September 15, 1891. Application for reissue filed February 13, 1893. Serial No. 462,208.

*To all whom it may concern:*

Be it known that I, GERALD W. HART, a citizen of the United States, now residing at Windsor, in the county of Hartford and State of Connecticut, have invented certain new and useful Improvements in Electric Snap-Switches, of which the following is a specification.

My invention relates to improvements in electric snap-switches; and the objects of my improvements are simplicity and economy in construction and general efficiency and certainty in operation.

Figure 1:
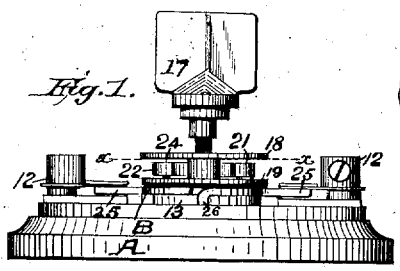
Figure 2:
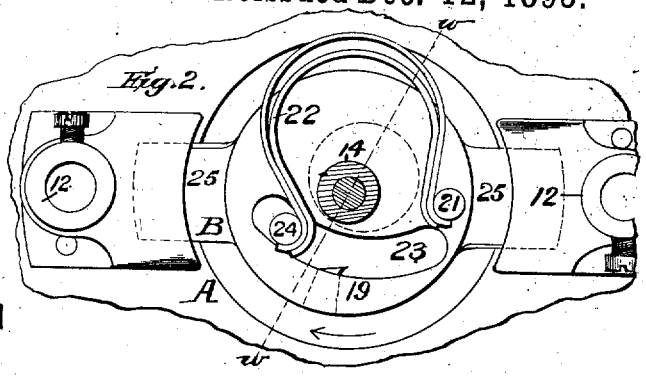
Figure 3:
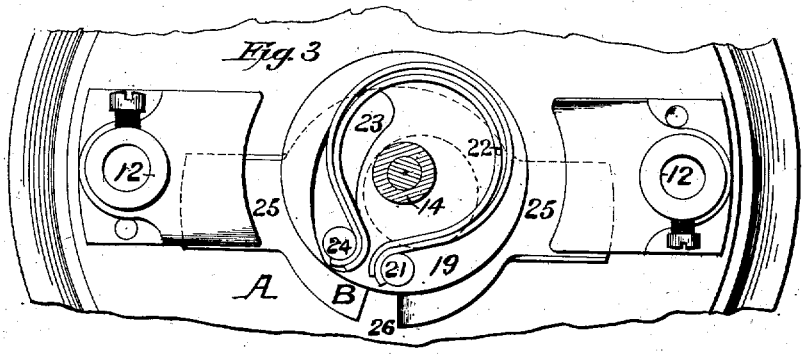
Figure 4:
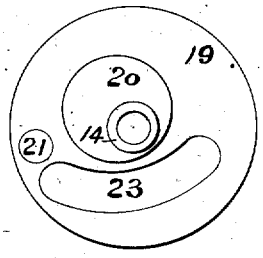
Figure 5:
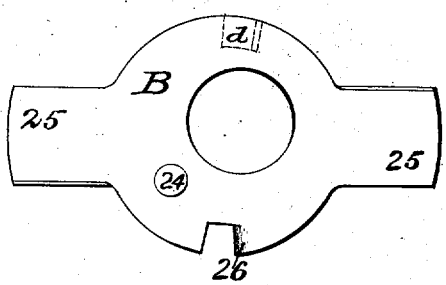
Figure 6:
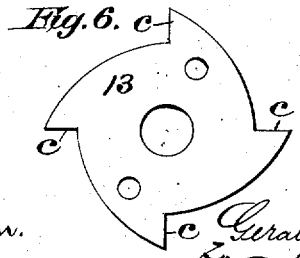
Figure 7:
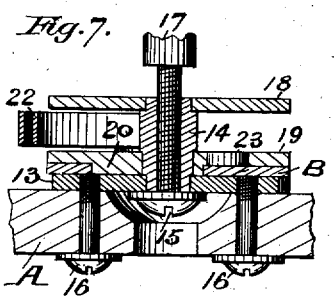
Figure 8:
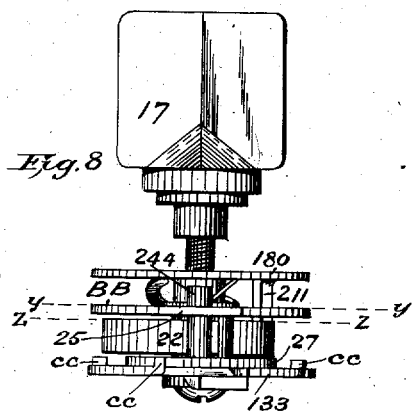
Figure 9:
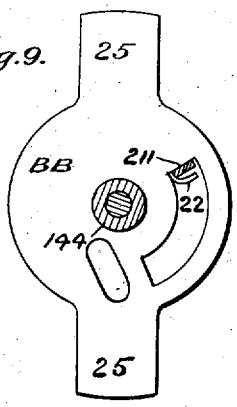
Figure 10:
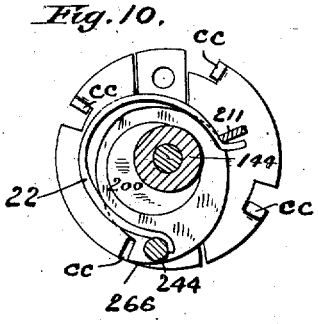
Figure 11:
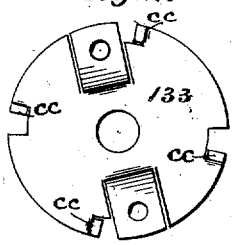

In the accompanying drawings: Figure 1 is a side elevation of my switch. Fig. 2 is a plan view of portions of the same, the central part being shown in horizontal section on the line *x x* of Fig. 1, said figure and the following figures being on an enlarged scale. Fig. 3 is a like view of the same with the parts in a different position. Fig. 4 is a reverse plan view of the spring-plate. Fig. 5 is a plan view of the switch-plate. Fig. 6 is a plan view of the stop-plate. Fig. 7 is a vertical section on the line *w w*, Fig. 2. Fig. 8 is a side elevation of my switch in a somewhat modified form, the base-block and contact-post being omitted. Fig. 9 is a horizontal section on the line *y y* of Fig. 8. Fig. 10 is a horizontal section on the line *z z* of Fig. 8, and Fig. 11 is a plan view of the stop-plate.

A designates the base-block, to which the stationary contact-posts 12 and the stop-plate 13 are affixed. In the center of the stop-plate 13 I secure the central hub 14 in any proper manner—as, for instance, by means of a screw 15, as shown in Fig. 7—the stop-plate 13 being secured to the base A by means of screws 16 and provided with four stop-shoulders *c* at equal distances apart. The upper end of this hub is provided with an operating-handle 17, which may be screwed in or otherwise connected thereto.

To the upper end of the hub 14 I secure a cap-plate 18, and a short distance therefrom I secure the spring-plate 19, both of said plates being rigidly secured to the central hub 14 in any proper manner—as, for instance, by soldering or riveting. The spring-plate has rigidly connected with it the eccentric 20, Figs. 4 and 7, the position of which is indicated in broken lines in Figs. 2 and 3, and also a stud 21, against which one end of the spring 22 acts. It is also provided with a slot, as at 23, through which passes the stud 24, against which the opposite end of the spring acts. The spring lies between the cap-plate and spring-plate.

The switch-plate B is provided with a round opening to one side of its center for receiving the eccentric 20, said switch-plate working between the spring-plate and the stop-plate. This switch-plate is also provided with moving contact-pieces 25 for engagement with the stationary contacts, with a catch 26, for engaging the stop-shoulder of the stop-plate 13, and the stud or pin 24, before referred to, as passing through the slot 23 and acted upon by the spring 22.

By turning the handle 17 in the direction indicated by the dart in Fig. 2 the central hub and parts rigidly connected therewith move with it, carrying the eccentric and spring-pin 21 from the position shown in Fig. 2 to that shown in Fig. 3, thereby compressing the spring and also moving the switch-plate laterally, thereby carrying the catch 26 radially outward to withdraw it from one of the stop-shoulders of the stop-plate. The parts in Fig. 3 are represented as almost ready to be thus disengaged. As the central hub is moved onward, the catch 26 is wholly withdrawn from the stop shoulder of the stop-plate, so as to release the switch-plate and permit it to snap around under the full force of the spring 22, its movement being arrested as the catch 26 comes in contact with the succeeding stop-shoulder on the stop-plate. When the switch-plate thus moves nearly one-quarter of a revolution on its axis, the central hub is relatively stationary, so that the eccentric 20 becomes for the time being the axis of the switch-plate, and consequently the catch 26 is drawn radially inward toward the central hub as the switch-plate advances, and is stopped by the succeeding stop-shoulder. By turning the handle again the parts will operate as before, and the switch-plate will be stopped at the next quarter of a revolution on the succeeding stop-shoulder, whereby the moving contact-pieces are brought into or out of contact with the stationary contact-pieces, as in ordinary switches of this class.

The modification shown in Figs. 8 to 11, inclusive, has the same generic features and mode of operation. Its stop-plate 133 has its stop-shoulders *c c* formed in upwardly projecting lugs instead of shoulders upon the outer edge of the plate. This is for the purpose of enabling the catch to pass on the inside of said stop-shoulders and to be disengaged therefrom by drawing it radially inward instead of outward. The central hub 144 has the eccentric 200 rigidly formed or attached to it, while the spring-plate 180 is rigidly secured to the upper end of said hub. This spring plate carries a spring-stud 211, that passes through a slot in the switch-plate B B. This switch-plate is centrally pivoted on the central hub instead of being eccentrically mounted thereon.

Upon the eccentric 200 I mount a catch-plate 27, having a catch 266, and a spring-stud 244, that passes up through a slot in the switch-plate, and which stud receives one end of the spring 22, while the other end bears against the stud 211.

The operation is substantially the same as before described. Turning the operating-handle carries the spring-plate and its stud 211 to compress the spring, and also turns the eccentric to gradually withdraw the catch from one of the stop shoulders, upon which withdrawal the spring acts through the stud 244, that passes through the switch-plate to carry said switch-plate one-quarter of a revolution. The switch-plate is stopped by the catch 266 engaging the succeeding stop-shoulder on the stop-plate as said catch is forced outwardly under the action of the eccentric.

While I prefer to use the stop-plate with the stop-shoulders *c*, formed by notches in the edge of said plate, and to force the catch radially outward, as first described, it is evident that I could use the construction first described with a stop-plate like that shown in Fig. 11 by merely forming the catch 26 on the switch-plate diametrically opposite the position shown in full lines—as, for instance, as indicated by broken lines at *d* in Fig. 5—by means of which change the catch would on the first movement of the handle and eccentric be moved radially inward instead of outwardly. In both of the constructions shown the catch is moved radially outward and inward by the positive movement of the eccentric. The construction is simple, efficient, and certain in operation.

Having indicated certain changes in the application of this eccentric or crank-pin for engaging and disengaging the catch, it is evident that other changes may be readily devised and still embody the general feature of my switch.

I claim as my invention—

The herein-described snap-switch, consisting of a stop-plate having stop-shoulders, a central hub, and operating handle, an eccentric moving with said hub, a switch-plate, a spring-plate, a spring, and a catch operated by said eccentric for releasing and stopping the switch-plate, substantially as described, and for the purpose specified.

GERALD W. HART.

Witnesses:
CHAS. L. BURDETT,
Q. B. JENKINS.